Figure 1:
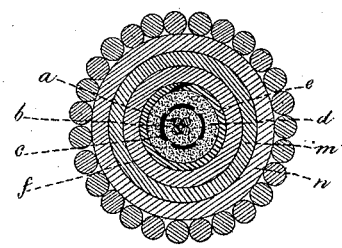

(No Model.)

S. F. SHELBOURNE.
SUBMARINE TELEGRAPH CABLE.

No. 297,180. Patented Apr. 22, 1884.

Witnesses:
John Buckler,
Herbert P. Brush

Inventor:
Sidney F. Shelbourne

UNITED STATES PATENT OFFICE.

SIDNEY F. SHELBOURNE, OF NEW YORK, N. Y.

SUBMARINE-TELEGRAPH CABLE.

SPECIFICATION forming part of Letters Patent No. 297,180, dated April 22, 1884.

Application filed September 8, 1883. (No model.)

*To all whom it may concern:*

Be it known that I, SIDNEY F. SHELBOURNE, a citizen of the United States, residing in the city of New York and State of New York, have invented a new and useful Telegraph Cable for Submarine and also Underground Communication; and I do hereby declare that the following is a full and clear description of my invention.

The chief difficulty in operating long submarine or subterranean electric cables is by reason of what is known as "static charge," due to a greatly-increased capacity of the conductor in such a situation to receive and store up the electric energy of the battery within the cable, and its insulation, so that a notable interval passes before the electric force has arrived at the remote end of the cable to give its signal, and hence this delay in giving the proper signal has been assigned to a retardation of the current by reason of the phenomena just mentioned. The Atlantic cables are now worked through the medium of a condenser, which is, in fact, but a modification of the Leyden-jar coatings, and involving the same philosophical principles. While some advantages are secured by this arrangement, the chief features of the difficulty still remain. It is a well-known fact that if the outer coating of the Leyden jar is insulated from the earth no charge, except as indicated by one or two feeble sparks, can be given to its interior coating. Professor Henry, who patiently investigated the laws of dynamic induction as developed in insulated bands of copper and coils of fine wire in proximity to each other, showed conclusively that an interposing coil between two others did not prevent induction between them as long as its two ends were not connected together; but did effectually do so on joining the two ends with each other. It has been shown that electricity, whatever the agency of its production, is one in its nature, and static charge and dynamic induction, at least when attending a battery-current, are identical in cause and correlated in the principles or laws which govern them. The philosophical theory upon which induction proceeds, assuming two fluids, is that a positive current repels through an insulation its like and attracts its opposite. If, then, the outer coating of the Leyden jar is connected with the earth—an infinite reservoir—and the interior of the jar supplied with the positive element, the like element leaves the outer coating for the earth, and an inexhaustible supply of the negative element is ready to mount to the outer coating in proportion as the positive element is supplied to the interior coating. This same theory would properly account, in dynamic electricity, for the induced currents in opposite directions to the inducing ones in adjacent insulated conductors where both have their circuits completed, either metallic or through the earth; but if the circuit is not completed, either in the one way or the other, in the adjacent wire, no current and no dynamic induction can ensue in that conductor. It becomes inert, and neither shows a current itself nor prevents one, nor does it prevent static charge by influences through or from beyond it. Experimenters in England found, therefore, that an outer metallic coating over the insulation of the conducting-cable wire gave no relief from the difficulties of static charge, it being a fact that this coating was in communication with the earth along its whole length, and therefore, so far as induction is concerned, it may be taken as being a part of the earth. Even had it been insulated laterally and connected to earth at its ends, so far as static charge alone is considered, the earth's vast source of negative element could supply the conditions of static charge along the wire from either end, and especially the end next to the battery giving the positive current. From what has just been said, therefore, the object and scope of the present invention will readily be understood. It is to provide about the conducting wire or core of a cable a completed and insulated metallic circuit not connected with the earth, but completely surrounding the conducting-core and interposed between it and the earth. This will be best illustrated by reference to the drawings making part of this specification, in which—

Figure 2:

Figure 1 is an enlarged cross-section of the cable. Fig. 2 is a longitudinal perspective of the several layers of the cable from the conducting-core outward; and Fig. 3 is a similar view of a portion of cable, showing at its end, by a full and also by a dotted curved line, the connections between the three metallic conducting-channels within the insulation of the cable.

In Fig. 2, *a* represents what is usually called the "conducting-core" of the cable, and composed of several small wires wound together. This core is covered with a thin insulation, $b$, preferably wound fiber saturated with the highest quality of insulating material. There follow upon $b$ four narrow copper strips, $c\ c\ c\ c$, about one-eighth of an inch wide and one sixtieth to one hundredth of an inch in thickness. These are wound by twos in opposite and very long spirals about $b$. Another thin insulation, $d$, quite similar to $b$, is then applied over the strips $c\ c\ c\ c$. There follows over the insulation $d$ a thin copper covering, $e$, whose conductivity will be about one-half greater than that of $c\ c\ c\ c$ and about or nearly equal to that of the core $a$. Over $e$ is applied the usual number of insulating-coatings, $f\ m\ n$, which are often varied in the use of different compounds for each. There is shown also in the drawings the usual protecting-shield, of heavy iron or steel wires, surrounding the coatings of insulation.

Figure 3:
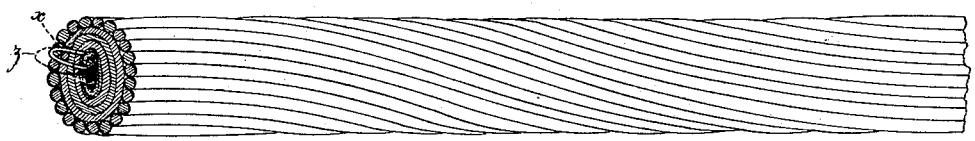

In Fig. 3, $x$ shows a connection between $e$ and the strips $c\ c\ c\ c$, while $z$ shows an alternative connection between $e$ and $a$, in which case the combined strips $c\ c\ c\ c$ are used as conductors for the signal-currents. The alternative connections are made identical at both ends of the cable. As to the operation of the arranged conductors, it will be seen that if $a$ carries the signal-current it will act inductively on $c\ c\ c\ c$, inducing a current in an opposite direction to its own; but it will also act by direct induction on $e$ through the spaces between the strips $c\ c\ c\ c$. As $e$ is greater than the combination of $c$ both in conductivity and surface, the current in $e$, passing to the ends of the cable, where it is connected with $c\ c\ c\ c$, will overbalance that in $c$, and consequently produce a current in $c$ of negative quality in the same direction with the positive (we will assume to be) in $a$ at the battery end. As only the negative electricity naturally in $c$ and $e$ is available by first induction to the positive attraction of $a$, and not the infinite fund of the whole earth, it will be seen that the current in $a$ cannot be stored beyond its equality with the negative in $c$ and $e$. When, on the other hand, the alternative connection is made—i. e., that of $a$ with $e$—and the combination of $c$ is used as the signal-conductor, it will be seen that the current in $c$ will act inductively both ways, inwardly on $a$ and outwardly on $e$, tending to cause a current in each opposite to its own direction. Now, since $a$ and $e$ are taken to be of equal conductivity, and are insulated laterally, but joined together at both ends of the cable, these currents will evidently be in opposite directions in the same round circuit, and therefore exactly balance each other; but the reactive induction strain of both of them on the signal-current in $c$ will be in the same direction with it.

It will be seen that to produce the result reached in the second arrangement it is not necessary that the conductor $e$ should be composed of strips, but may entirely envelop the insulation of $a$, in like manner as $d$ completely surrounds them both. I therefore do not confine my invention to the employment of $e$ in the open arrangement, as shown.

What is claimed as new is—

A submarine and subterranean electric cable composed of three conductors insulated from each other, one central and the others annular about it, combined so that the central or first annular forms the signal-conductor, and the ends of the remaining two are connected together, completing an induction-guard circuit, as herein set forth.

SIDNEY F. SHELBOURNE.

Witnesses:
FRANK S. TYLER,
T. L. KENNEDY.